July 15, 1930.    C. E. GALVIN    1,770,690
TOOL FOR TRIMMING PAPER
Original Filed Aug. 18, 1927
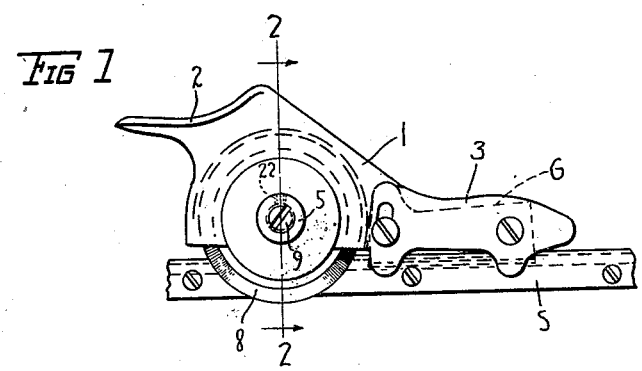
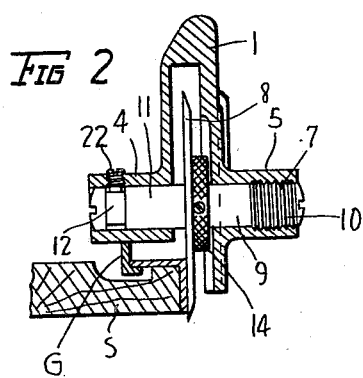
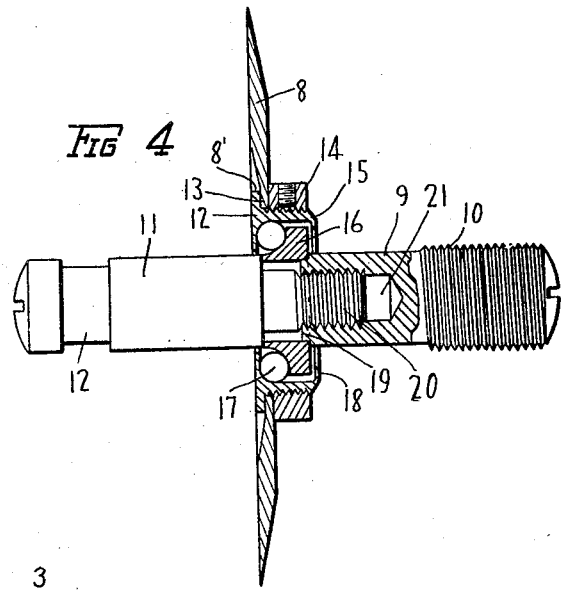
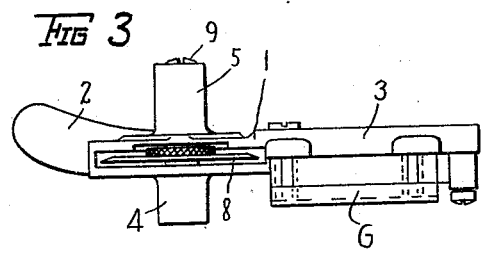
INVENTOR
Charles E. Galvin
BY Staley & Welch
ATTORNEYS Patented July 15, 1930

1,770,690

UNITED STATES PATENT OFFICE

CHARLES E. GALVIN, OF SPRINGFIELD, OHIO, ASSIGNOR TO THE RIDGELY TRIMMER COMPANY, OF SPRINGFIELD, OHIO, A CORPORATION OF OHIO

TOOL FOR TRIMMING PAPER

Original application filed August 18, 1927, Serial No. 213,933. Divided and this application filed May 22, 1929. Serial No. 365,175.

This invention relates to improvements in tools for trimming paper. It particularly relates to tools especially adapted for trimming wall paper in which a rolling cutter wheel is employed, such as described in my pending application Ser. No. 213,933 filed August 18th, 1927.

The object of the invention is to provide improved means for supporting the cutter wheel in the frame of the tool and providing for the axial adjustment thereof to simplify the construction and reduce manufacturing costs.

In the accompanying drawings:

Fig. 1 is a side elevation of a paper trimming tool embodying my improved construction.

Fig. 2 is a slightly enlarged section on the line 2—2 of Fig. 1.

Fig. 3 is a bottom plan view.

Fig. 4 is an enlarged view, partly in section, of some of the details.

Referring to the drawing, 1 is a recessed supporting head having a hand grip portion 2, a forward extension 3, and oppositely-arranged laterally extending bosses 4 and 5. The bosses 4 and 5 are each provided with bores in alignment, and in addition the boss 5 is provided with an interior thread 7 at its outer end. The bores open into the recess of the head.

The cutter disk is indicated at 8, this disk being carried on a ball bearing supported on a two-part stationary spindle in substantially the same manner as shown in my pending application referred to, with the exception that that member of the spindle assembly indicated at 9 is provided with an exterior thread 10 adapted to be threaded in the boss 5, while the other member of the spindle, 11, has a circumferential groove 12 near its outer end.

In Fig. 2 the assembled relation of the cutter disk and the frame of the tool is illustrated. The cutter disk 8 is concentrically mounted on a ball race 12, there being a flanged portion 13 received into a concentric recess 8' in the disk, and the parts held in place by a nut 14 screwed on the extended threaded portion 15 of the race 12 (Fig. 4). The cone 16 is placed on the balls 17 and the tube-like extension 18 of the race 12 is then swaged over to enclose the cone 16.

This cutter wheel assembly is inserted in the recess of the head and located so that it is approximately concentric with the bores in the bosses. The spindle member 9 is threaded into the boss 5 so that its shouldered end 19 projects into the recess when the cutter wheel assembly is placed on the shouldered end. The other spindle member 11 is then inserted in the bore in the boss 4, and its reduced threaded portion 20 is screwed in the interiorly threaded opening 21 in the spindle member 9, to the end that the cone 16 is tightly clamped between the two spindle members.

The head extension 3 is pivotally and yieldably connected with a gauge member G which is slidably mounted on a straight edge S in the manner described in my application referred to. The cutter wheel 8 is brought into proper adjustment with the straight edge by merely rotating the spindle assembly, the thread 10, in turning, causing axial movement of the spindle. When the proper adjustment is obtained, the spindle assembly is locked against turning by the use of a set-screw 22 threaded in the boss 4, the set-screw making contact with the shaft 11 in the groove 12, which is of sufficient width to ensure the proper adjustment being secured without interference with the screw itself.

Having thus described my invention, I claim:

1. In a tool of the character described, a supporting head having a recess, said head having aligned bores one on each side of said recess, a spindle mounted in said bores for axial movement, one end of said spindle having a threaded engagement with its corresponding bore whereby rotation of the spindle adjusts the same axially, and a cutting disk rotatably mounted on said spindle within said recess.

2. In a tool of the character described, a supporting head having a recess, said head having aligned bores one on each side of said recess, a two-part spindle mounted in said bore for axial movement, one end of said spindle having a threaded engagement with its corresponding bore whereby rotation of the spindle adjusts the same axially, the other end of said spindle having an annular groove, a set-screw carried by said head in line with said groove to hold said spindle against rotation, and a cutting disk rotatably mounted on said spindle within said recess.

3. In a tool of the character described, a supporting head having a recess, said head having aligned bosses, one on each side of said recess, one of said bosses having a plain bore and the other boss provided with screw threads, a two-part spindle mounted in said bosses for axial movement, one end of said spindle being threaded to engage the threads of the threaded bore whereby rotation of the spindle adjusts the same axially, adjustable means carried by said head for holding said spindle against rotation, and a cutting disk rotatably mounted on said spindle within said recess.

4. In a tool of the character described, a supporting head having a recess, said head having aligned bosses, one on each side of said recess, one of said bosses having a plain bore and the other recess a bore provided with screw threads, a two-part spindle mounted in the bores of said bosses, one end of said spindle having threads to engage with the threads of the threaded boss and the other end provided with an annular groove, a set screw carried by the other boss to engage the groove of the other end of said spindle, and a cutting disk rotatably mounted on said spindle within said recess.

In testimony whereof, I have hereunto set my hand this 17th day of May, 1929.

CHARLES E. GALVIN.